B. REMSEN & J. E. S. RUSSELL.
Cotton-Planters.
No. 155,889.                          Patented Oct. 13, 1874.
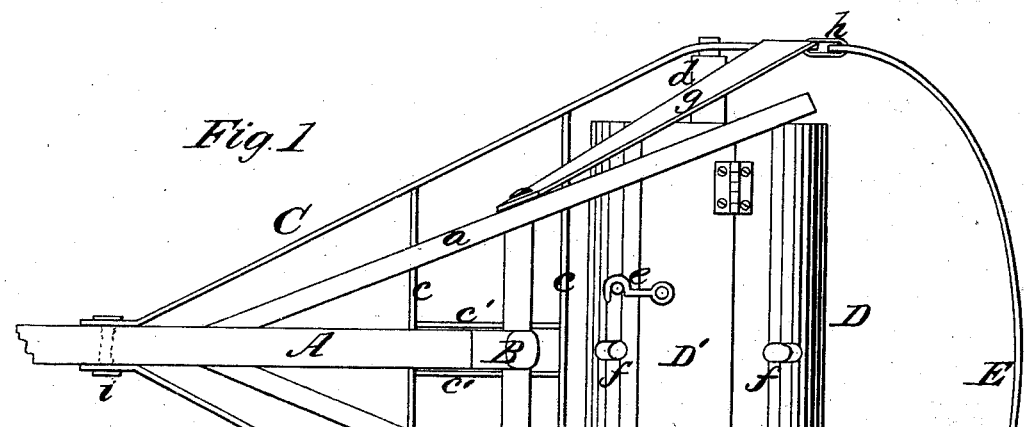
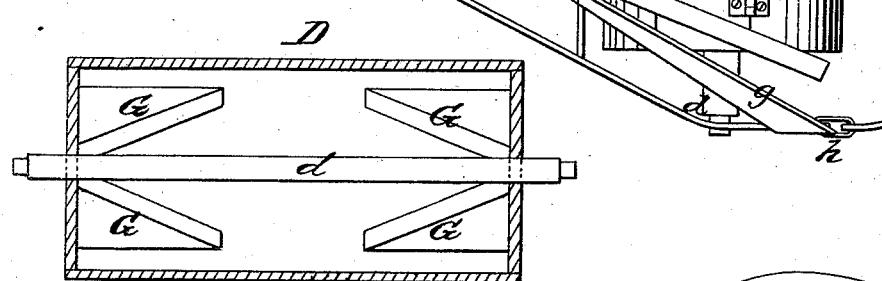
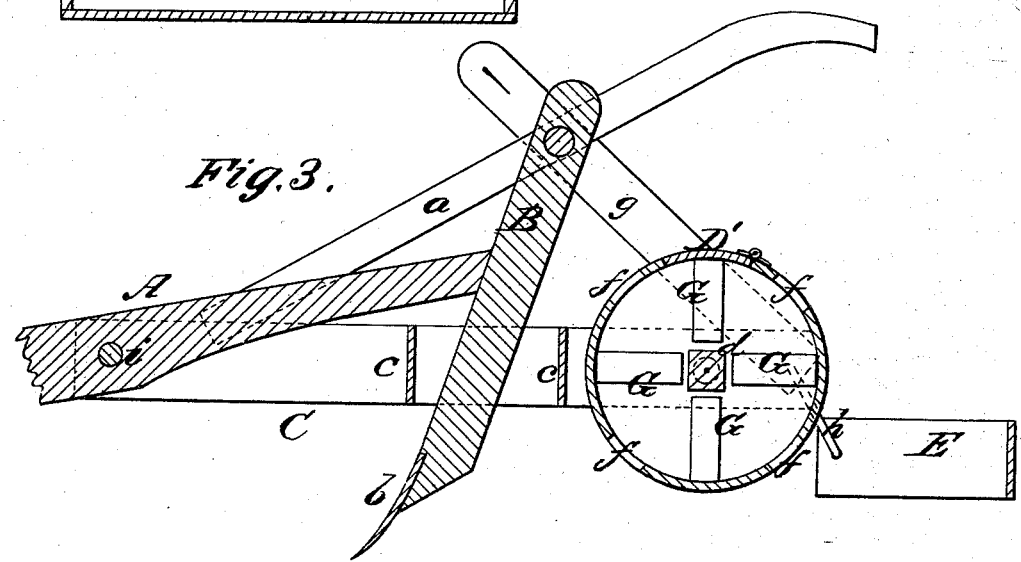
WITNESSES             INVENTORS
Mary S. Utley            Byron Remsen
E. H. Bates             John E. S. Russell
         BY        Chipman Hosmer & Co
                                     ATTORNEYS

UNITED STATES PATENT OFFICE.

BYRON REMSEN AND JOHN E. S. RUSSELL, OF WACO, TEXAS.

IMPROVEMENT IN COTTON-PLANTERS.

Specification forming part of Letters Patent No. 155,889, dated October 13, 1874; application filed July 11, 1874.

*To all whom it may concern:*

Be it known that we, BYRON REMSEN and JNO. E. S. RUSSELL, of Waco, in the county of McLennan and State of Texas, have invented a new and valuable Improvement in Cotton-Planters; and we do hereby declare that the following is a full, clear, and exact description of the construction and operation of the same, reference being had to the annexed drawings making a part of this specification, and to the letters and figures of reference marked thereon.

Figure 1 of the drawing is a representation of a plan view of our cotton-planter. Fig. 2 is a detail view of the same. Fig. 3 is a sectional view of the same.

This invention has relation to machines which are designed for planting cotton-seed; and it consists in a distributing-drum, having seed-openings through it, and inclined distributing-agitators inside of it, said drum being applied to turn in a frame which is pivoted to the beam of a shovel-plow, whereby the roller will accommodate itself to inequalities of surface passed over, and uniformly discharge the seed in the drill-rows, after which a drag or coverer will cover up the seed, as will be hereinafter explained.

In the annexed drawings we have represented our improved planter attached to a well-known kind of shovel-plow, of which A is the beam, $a\ a$ the handles, and B the standard, to which latter the shovel $b$ is secured. C designates a triangular frame, which is braced by cross-pieces $c\ c$, which latter are connected together by two longitudinal pieces, $c'\ c'$, between which the standard B plays freely. The front ends of the frame C are connected, by a pivot, $i$, to the plow-beam A, and in the rear ends of this frame the shaft $d$ of a cylinder turns freely. This cylinder D is hollow, and it is provided with a door, D', through the opening of which the cotton-seed is put into the cylinder, after which the door is shut and suitably fastened. At the middle of the length of the cylinder D holes $f$ are made, which are preferably oblong, and it is through these holes that the seed is discharged, as the cylinder is rotated, on the ground. G G designate agitators, the edges of which are inclined so as to direct the seed toward the discharging-holes, and keep up a continued discharge. These pieces G are arranged at the ends of the cylinder, and they will agitate the seed, and keep it in a suitable condition for causing its free discharge through holes $f$. After the seed escapes through the holes $f$ it is covered up in its furrow by a bow-shaped coverer, E, which is loosely connected to the rear extremities of the frame C by means of links $h\ h$. The rear ends of the frame C are connected to the handles $a\ a$ of the plow by means of the flexible straps $g$, which are adjustable.

What we claim as new, and desire to secure by Letters Patent, is—

1. The cylinders D, having agitators G, the edges of which are inclined to direct the seed toward the center discharging-holes $f$, as described.

2. The pivoted triangular frame C, plow-standard B, cylinder D, loosely-connected bow-shaped coverer E, and the flexible connections $h$ and $g$, all combined and constructed as specified.

In testimony that we claim the above we have hereunto subscribed our names in the presence of two witnesses.

BYRON REMSEN.
JNO. E. S. RUSSELL.

Witnesses:
P. E. McWILLIAMS,
R. W. DAVIS.